United States Patent Office 2,870,099
Patented Jan. 20, 1959

2,870,099
PRODUCTION OF POLYMERS OF EPOXIDE COMPOUNDS

Edward T. Borrows, Bowdon, and David G. Stewart, Flixton, Manchester, England, assignors to Shell Development Company, New York, N. Y., a corporation of Delaware No Drawing. Application February 2, 1956
Serial No. 563,154

Claims priority, application Great Britain February 4, 1955

14 Claims. (Cl. 260—2)

This invention relates to a process for the production of polymers of an epoxide compound. More particularly, the invention pertains to a process for the production of polymers of an epoxidized mono-olefinic hydrocarbon, especially high molecular weight polymers of an alkylene oxide.

The conventional processes and catalysts heretofore used in the production of alkylene oxide polymers do not yield products of high molecular weights—i. e., polymers having molecular weights above 20,000. It has, however, been stated (Staudinger and Lohmann, Liebig's Annalen der Chemie 505, 41, 1933), that if ethylene oxide is left in contact with a catalysts consisting of zinc oxide, strontium oxide or calcium oxide for very long periods ranging from 3 months to 2 years, high polymers having molecular weights of from 60,000 to 120,000 are obtained. It is further disclosed in German Patent No. 821,349 that when alkylene oxides such as ethylene oxide or 1,2-propylene oxide are contacted with activated alumina at 25 to 50° C. under pressure, high molecular weight polymers are produced, the degree of polymerization being up to 2000 and higher.

It is an object of the present invention to provide an improved process for the production of polymers of an epoxide compound. Another object is to provide a process for production of epoxide polymers having molecular weights about 20,000. A further object is to provide a process for producing alkylene oxide polymers employing a more active catalyst.

These and other objects which will become apparent are accomplished by the present invention which is an improved process for the production of polymers of an epoxide compound. According to the process an epoxidized mono-olefinic hydrocarbon is contacted with a catalyst of the formula $Me(OR)_x$ wherein Me is a polyvalent metal selected from groups II and III of the periodic table, OR is an alkoxy radical, and $x$ is the valency of the metal Me. The metal in the catalyst is any one of the groups II and III metals such as Be, Mg, Ca, Sr, Ba, Ra, Zn, Cd, Hg, Al, Ga, In, Tl, Sc, Y, La and Ac. The preferred catalysts for use in the process of the invention are alkoxides of aluminum, zinc and magnesium. The alkoxides may be derived from normal, secondary or tertiary alcohols. Thus representative alkoxy radicals contained in the catalyst include methoxy, ethoxy, n-propoxy, isopropoxy, n-butoxy, isobutoxy, sec-butoxy, tert-butoxy, hexoxy, dodecoxy, octadecoxy, and like radicals. Preferably the alkoxy group in the catalyst contains up to 10 carbon atoms, particularly 2 to 4 carbon atoms. The organo-metallic catalysts are known compounds.

The process of the invention is applicable to polymerizing any epoxidized mono-olefinic hydrocarbon—i. e., a hydrocarbon containing an oxirane group. Although the process is especially suited to produce high molecular weight polymers of alkylene oxides, particularly those of 2 to 4 carbon atoms such as ethylene oxide, 1,2-propylene oxide and isobutylene oxide, the process can be used to obtain polymers of any other of the epoxide compounds such as 1,2-butylene oxide, 2,3-butylene oxide, butadiene monoxide, 1,2-pentylene oxide, 2,3-hexylene oxide, 3,4-hexylene oxide, 3-ethyl-2,3-pentylene oxide, 1,2-dodecylene oxide, cyclopentene oxide, cyclohexene oxide, camphene oxide, styrene oxide, benzylethylene oxide, and the like. In being polymers of mono-epoxide compounds, the products of the process are thermoplastic substances.

The process of the invention is executed by bringing the epoxy compound in liquid state into contact with the catalyst. The polymerization reaction may be carried out in the presence of an inert solvent—e. g. an aromatic hydrocarbon (benzene, toluene, xylene, etc.), aliphatic hydrocarbon (isopentane, n-hexane, octane, etc.), chlorinated hydrocarbon (carbon tetrachloride, ethylene dichloride, propylene dichloride, etc.) and the like, or the reaction may be effected without solvent. Use of solvent is a convenient means of handling the catalyst. Various amounts of solvent are suitable such as from about 10% to 100% or more of the epoxide treated. The amount of catalyst may also be varied over wide limits although ordinarily about 0.1 to 2% by weight is used.

The temperature at which the reaction is carried out may be from about 0 to 200° C. or higher. Usually temperatures of about 90 to 160° C. are employed. The pressure under which the reaction is conducted is from about atmospheric to 40 or more atmospheres. Since the polymerization reaction occurs in liquid phase, sufficient pressure is employed to keep the epoxide compound in liquid condition regardless of whether an inert solvent is present in the reaction mixture or not. The choice of catalyst, temperature and pressure is an effective means of controlling the intrinsic viscosity (molecular weight) of the resulting polymer.

The process of the invention is executed in a closed reaction vessel in either batch or continuous fashion. The epoxide compound is generally added to the catalyst or to a solution of the catalyst in a solvent, but the addition may be in the reverse order if desired. The mixture of epoxide compound in contact with the catalyst is then allowed to stand or is heated to the desired temperature for a time sufficient to obtain a substantial amount of the polymer. Batch operation is usually conducted by bringing the epoxide compound and catalyst together in a closed reaction vessel wherein the desired polymerization occurs with or without stirring of the reaction mixture. It is convenient to effect the polymerization in continuous fashion with use of a residence reactor. In such operation, a mixture of the epoxide compound, catalyst and solvent, if used, is charged to a vessel fitted with an external pump connected by pipes to more or less opposite points of a reaction vessel whereby agitation and circulation is provided. After the desired extent of polymerization has occurred, fresh charge material is fed continuously or intermittently to the vessel and substantially corresponding amounts of reaction mixture are withdrawn. A steady state is reached and the desired polymer is produced in continuous fashion. If desired, the external circuit may be fitted with a heat exchanger to take care of the thermal requirements of the system.

The excess or unreacted epoxide compound remaining in the reaction mixture upon completion of the desired extent of polymerization is separated or recovered by distillation. The resulting product is purified by washing with a non-solvent for the polymer, or by dissolving it in a solvent and slowly precipitating it by addition of a non-solvent miscible with the solvent. Concentration of the filtrate from this latter operation usually yields low molecular weight oils, the amount of which depends on the catalyst used. Water is usually a suitable solvent for low and high polymers of ethylene oxide while polymers of higher epoxide require use of more active solvents such as acetone.

The polymer is freed of catalyst by bringing it or a solution thereof into contact with water, filtering off the resulting metal oxide or hydroxide and evaporating the solution, or if insoluble in water, by extraction with dilute mineral acid such as hydrochloric or sulfuric acid.

The products of the process are valuable polyethers. The liquid polymers may be used as solvents, chemical raw materials and plasticizing agents for resins. The solid polymers may be molded into useful articles or employed as film-forming ingredients in protective coating compositions. The polymers are also useful as lubricants, binders, vehicles, and intermediates in the rubber, food, pharmaceutical, cosmetic, agricultural, textile, petroleum and many other industries.

The following examples illustrate the process of the invention which, however, is not to be construed as limited to details described therein.

*Example 1*

Gaseous ethylene oxide (88.7 parts by weight) was added to a solution of aluminum n-butoxide (0.5 part by weight) in benzene (88 parts by weight). After maintaining the mixture at 20° C. for 10 days, the excess ethylene oxide was distilled off and the benzene solution obtained added slowly to petroleum ether (100 parts by weight) with stirring. A colorless solid (3.5 parts by weight) was precipitated which was filtered off and dried. The relative viscosity ($\eta r$) of this polymer in 0.1% trichlorethylene solution was 1.468. Concentration of the filtrate gave no other product. When the solid was dissolved in water (500 parts by weight) containing concentrated ammonia solution (1 part by weight) and refluxed for two hours a white precipitate of inorganic material was obtained which was filtered off. The polymer was recovered from solution by distilling off the water, dissolving in benzene and precipitating with petroleum as described above. The intrinsic viscosity of the material was 2.844.

*Example 2*

Liquid ethylene oxide (88.7 parts by weight) was rapidly run into a cooled solution of aluminum n-butoxide (0.5 part by weight) in benzene (8.8 parts by weight) in an autoclave which was then heated at 100° C. for 65 hours. The product was distilled with benzene (100 parts by weight), excess ethylene oxide distilled off and the resulting solution precipitated with petroleum ether as before. A colorless solid (16 parts by weight: $\eta r = 1.148$) was obtained and concentration of the filtrate yielded an oily residue (2.7 parts by weight).

*Example 3*

Using the procedure described in Example 2, ethylene oxide (88.1 parts by weight), benzene (8.8 parts by weight) and aluminum iso-propoxide (0.7 part by weight) were heated at 100° C. for 40 hours. This gave a colorless polymer (31.4 parts by weight: $\eta r = 1.228$) and an oily residue (1.6 parts by weight).

*Example 4*

Following the procedure described in Example 2, ethylene oxide (88.7 parts by weight), benzene (8.8 parts by weight) and magnesium tert-butoxide (0.5 part by weight) were heated at 107° C. for 17 hours. This gave a colorless polymer (8.4 parts by weight: $\eta r = 1.3311$) and an oily residue (2.0 parts by weight).

*Example 5*

Following the procedure described in Example 2, ethylene oxide (88.7 parts by weight), benzene (8.8 parts by weight) and zinc tert-butoxide (0.5 part by weight), were heated at 100° C. for 16 hours. This gave a colorless polymer (3.8 parts by weight: $\eta r = 1.5132$) and an oily residue (0.8 part by weight).

*Example 6*

1,2-propylene oxide (80 parts by weight) and aluminum tert-butoxide (0.5 part by weight) were heated in an autoclave at 130° C. for 40 hours. After removing excess oxide from the product by distillation, the polymer was extracted with hot dilute hydrochloric acid. When dried a colorless solid (5.0 parts by weight: $\eta r = 1.3574$) was obtained, which was soluble in most organic solvents but insoluble in water.

The polymers produced as described above have molecular weights above 20,000 as determined by intrinsic viscosity measurements of solutions thereof. A sample of known molecular weight of 20,000 having an intrinsic viscosity of 0.5 in solution was used as a basis for comparison.

We claim as our invention:

1. A process for the production of a polymer of an epoxide compound which comprises polymerizing a vic-epoxy hydrocarbon free of unsaturation other than aromatic unsaturation at about 0 to 200° C. in the presence of about 0.1 to 2% by weight of a catalyst of the formula Me(OR)$_x$ wherein Me is a metal selected from the group consisting of the metals in groups II and III of the periodic table, OR is an alkoxy radical, and $x$ is the valency of the metal Me.

2. A process according to claim 1 wherein the hydrocarbon containing the oxirane group is an alkylene oxide of 2 to 4 carbon atoms.

3. A process according to claim 1 wherein the hydrocarbon containing the oxirane group is ethylene oxide.

4. A process according to claim 1 wherein the hydrocarbon containing the oxirane group of 1,2-propylene oxide.

5. A process for the production of a polymer of an alkylene oxide which comprises polymerizing an alkylene oxide having the oxygen atom contained in an oxirane group at about 0 to 200° C. in the presence of about 0.1 to 2% by weight of a catalyst of the formula Me(OR)$_x$ wherein Me is a metal selected from the group consisting of the metals in groups II and III of the periodic table, OR is an alkoxy radical, and $x$ is the valency of the metal Me.

6. A process for the production of a polymer of ethylene oxide which comprises polymerizing ethylene oxide at about 90 to 160° C. in the presence of about 0.1 to 2% by weight of aluminum tri-alkoxide.

7. A process for the production of a polymer of ethylene oxide which comprises polymerizing ethylene oxide dissolved in an inert solvent in the presence of about 0.1 to 2% by weight of aluminum n-butoxide at about 0 to 200° C.

8. A process according to claim 4 wherein the catalyst is aluminum tert-butoxide.

9. A process according to claim 5 wherein the catalyst is aluminum isopropoxide.

10. A process according to claim 9 wherein the alkylene oxide is ethylene oxide.

11. A process according to claim 5 wherein the catalyst is magnesium tert-butoxide.

12. A process according to claim 11 wherein the alkylene oxide is ethylene oxide.

13. A process according to claim 5 wherein the catalyst is tert-butoxide.

14. A process according to claim 13 wherein the alkylene oxide is ethylene oxide.

References Cited in the file of this patent

UNITED STATES PATENTS

| | | |
|---|---|---|
| 1,976,678 | Wittwer | Oct. 9, 1934 |
| 2,706,189 | Pruitt et al. | Apr. 12, 1955 |
| 2,767,158 | Schlenker et al. | Oct. 16, 1956 |

Notice of Adverse Decision in Interference

In Interference No. 91,859 involving Patent No. 2,870,099, E. T. Borrows and D. G. Stewart, PRODUCTION OF POLYMERS OF EPOXIDE COMPOUNDS, final judgment adverse to the patentees was rendered May 13, 1964, as to claims 6 and 10.

[*Official Gazette September 28, 1965.*]